(12) United States Patent
Zeng et al.

(10) Patent No.: US 7,339,752 B2
(45) Date of Patent: Mar. 4, 2008

(54) IMAGE PICK-UP LENS SYSTEM

(75) Inventors: Ji-Yong Zeng, Beijing (CN); Ying-Bai Yan, Beijing (CN); Guo-Fan Jin, Beijing (CN); Min-Qiang Wang, Beijing (CN); Zhuo Wang, Beijing (CN)

(73) Assignees: Tsinghua University, Haidian District, Beijing (CN); Hon Hai Precision Industry Co., Ltd., Tu-Cheng, Taipei Hsien (TW)

( * ) Notice: Subject to any disclaimer, the term of this patent is extended or adjusted under 35 U.S.C. 154(b) by 216 days.

(21) Appl. No.: 11/222,182

(22) Filed: Sep. 8, 2005

(65) Prior Publication Data
US 2006/0050410 A1   Mar. 9, 2006

(30) Foreign Application Priority Data
Sep. 8, 2004   (CN) ................ 2004 1 0051451

(51) Int. Cl.
G02B 13/20 (2006.01)
G02B 5/18 (2006.01)
G02B 27/44 (2006.01)

(52) U.S. Cl. ............ 359/707; 359/566; 359/569; 359/570; 359/708; 359/718; 359/739; 359/642

(58) Field of Classification Search ........ 359/718, 359/642, 707–712, 738, 739, 566, 569, 570
See application file for complete search history.

(56) References Cited

U.S. PATENT DOCUMENTS

| | | | |
|---|---|---|---|
| 6,055,105 A | | 4/2000 | Boku et al. |
| 2002/0041451 A1* | | 4/2002 | Harada .................. 359/745 |
| 2003/0016454 A1* | | 1/2003 | Yamaguchi et al. ...... 359/819 |
| 2003/0117723 A1 | | 6/2003 | Shinohara |
| 2003/0193605 A1 | | 10/2003 | Yamaguchi |
| 2004/0012861 A1 | | 1/2004 | Yamaguchi |

* cited by examiner

*Primary Examiner*—Evelyn A. Lester
(74) *Attorney, Agent, or Firm*—Morris Manning Martin LLP; Tim Tingkang Xia, Esq.

(57) ABSTRACT

An image pick-up lens system from an object side to an image side includes an aperture stop (10), and a meniscus-shaped lens (20) having a concave surface on the object side and a convex surface on the image side. The lens has at least one aspheric surface and a diffraction grating provided on the convex surface thereof. The lens system satisfies the following condition: (1) $0.1 < R2/R1 < 0.5$, wherein, R1 is an absolute value of a radius of curvature of the concave surface of the lens, and R2 is an absolute value of a radius of curvature of the convex surface of the lens. Condition (1) governs a distribution of refracting power for the lens, in order to correct monochromatic aberrations. The lens system also satisfies other conditions (2)-(4) as disclosed, in order to provide compactness, cost-effectiveness and improved optical performance.

18 Claims, 8 Drawing Sheets

IMAGE PICK-UP LENS SYSTEM

TECHNICAL FIELD

The present invention relates to an image pick-up lens system which projects an image of an object onto an image pick-up surface, the image pick-up lens system being suitable for use in products such as camera modules.

BACKGROUND

In recent years, camera modules for taking photos have begun to be incorporated in mobile terminals such as mobile phones and lap-top computers. Downsizing the camera modules is a prerequisite for enhancing the portability of these apparatuses. The camera module operates with an image pickup device such as a CCD (Charged Coupled Device) or a CMOS (Complementary Metal Oxide Semiconductor). Recently, a pixel having the size of approximately a few micrometers has become commercially feasible, and an image pickup device with high resolution and a compact size can now be mass manufactured and marketed. This is accelerating the demand for downsizing of image pick-up lens systems so that they are able to be suitably used with miniaturized image pickup devices. It is also increasing expectations of cost reductions in image pick-up lens systems, commensurate with the lower costs enjoyed by modern image pickup devices. All in all, an image pick-up lens system needs to satisfy the oft-conflicting requirements of compactness, low cost, and excellent optical performance.

Compactness means in particular that a length from a lens edge of the lens system to an image pick-up surface should be as short as possible.

Low cost means in particular that the lens system should include as few lenses as possible; and that the lenses should be able to be formed from a resin or a plastic and be easily assembled.

Excellent optical performance can be classified into the following two main requirements:

First, a high brightness requirement, which means that the lens system should have a small F number (FNo.). Generally, the FNo. should be 2.8 or less.

Second, a high resolution requirement, which means that the lens system should appropriately correct fundamental aberrations such as spherical aberration, coma aberration, field curvature, astigmatism, distortion, and chromatic aberration.

In a lens system which satisfies the low cost requirement, a single lens made from a resin or a plastic is desired. However, it is difficult for the single lens system to correct chromatic aberration and achieve excellent optical performance.

For appropriately correct chromatic aberration, it is desired to employ two or even more lenses. Generally, in order to correct chromatic aberration, the two lenses of the system must be made from different materials, with the lenses having a relatively large difference being their respective Abbe constants. Because there are only a few varieties of plastic and resin materials which can be suitably used to make lenses, even if the two lenses are made from a different plastic or resin material, the range of variation of optical properties of the two lenses is limited. This makes it difficult to effectively correct chromatic aberration. Therefore, in most two-lens systems which have excellent optical performance, at least one of the lenses is made from optical glass. As a result, such systems generally yield limited cost efficiency, and tend to be unduly heavy.

Another important consideration is that plastic and resin materials are prone to absorb water. For example, the water absorbency of polymethyl methacrylate (PMMA) is 1.5%, and the water absorbency of polycarbonate (PC) is 0.4%. Among the plastic or resin materials which can be suitably used to make lenses, only zeonex materials (polyolefin resins or cyclo-olefin polymers) have relatively low water absorbency. The water absorbencies are less than 0.01%. Zeonex materials are available from the Japanese Zeon Corporation. Therefore unless a non-glass lens is made from a zeonex material, it is liable to absorb water and deform. As a result, the optical performance of the lens system is diminished. All in all, a heretofore unaddressed need exists in the industry to address the aforementioned deficiencies and inadequacies.

SUMMARY

An image pick-up lens system in accordance with a preferred embodiment of the present invention includes an aperture stop, and a meniscus-shaped lens having a concave first surface on an object side and a convex second surface on an image side. The first surface of the lens is aspheric. The second surface of the lens has a diffraction grating provided thereon. The aperture stop and the meniscus-shaped lens are aligned in that order from the object side to an image side. Preferably, the first and second surfaces of the lens are aspheric.

According to a first aspect, the following condition is satisfied:

$$0.1 < R2/R1 < 0.5, \tag{1}$$

wherein, R1 is an absolute value of a radius of curvature of a vertex of the first surface of the lens on the object side, and R2 is an absolute value of a radius of curvature of a vertex of the second surface of the lens on the image side.

According to a second aspect, to limit a thickness of the lens, the following condition is satisfied:

$$0.5 < d2/R2 < 1.5, \tag{2}$$

wherein, d2 is a thickness of the lens.

According to a third aspect, to correct chromatic aberration, the following condition is satisfied:

$$200 < -C_2 \times f < 450, \tag{3}$$

wherein, f is a focal length of the lens system and $C_2$ is the power phase coefficient of the phase function of the diffraction grating of the second surface of the lens.

Further, to limit total length from the aperture stop to an image pick-up surface and make the lens system easy to manufacture, the following condition is satisfied:

$$d1/T < 0.15 \tag{4}$$

wherein, d1 is a length from the aperture stop to the first surface of the lens and T is a total length from the aperture stop to an image pick-up surface.

Further still, the same lens is made from a plastic or a resin material. Preferably, the lens is made from a zeonex material or an equivalent material having low water absorbency.

The lens system according to the preferred embodiment of the present invention can guarantee that the diffraction grating has a relatively large critical dimension. Thus, the diffraction grating is relatively easy to manufacture. In particular, the diffraction grating can be mass manufactured by molding technology at a reduced cost. In addition, the diffraction grating helps the lens system to appropriately correct foundational aberrations. Further, because the lens is made from a plastic or a resin, the manufacture cost is reduced. Moreover, because the zeonex material is employed to make the lenses, reduction of the optical performance of the lens system due to deformation of the lenses caused by water absorbency is prevented.

Other advantages and novel features will become more apparent from the following detailed description of embodiments when taken in conjunction with the accompanying drawings, in which:

DETAILED DESCRIPTION OF THE EMBODIMENTS

Figure 1:
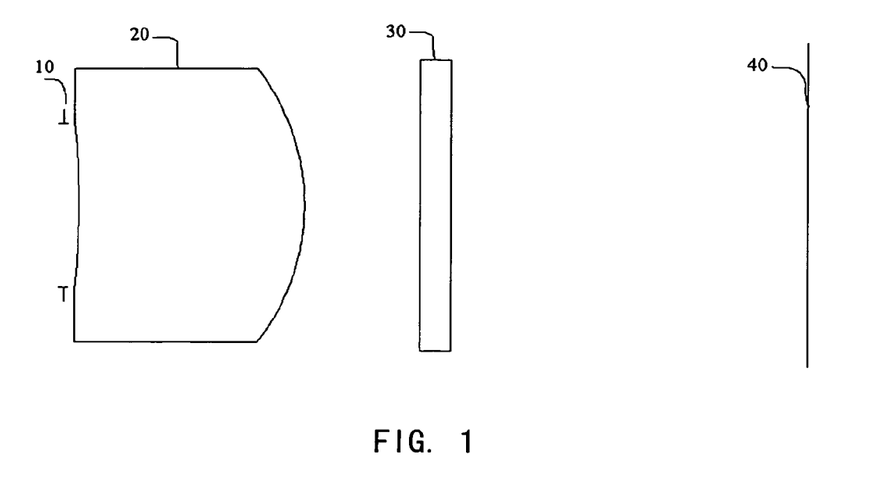
FIG. 1 is a schematic, cross-sectional view of an image pick-up lens system in accordance with a preferred embodiment of the present invention, and also shows an image pick-up surface.
Figure 2:
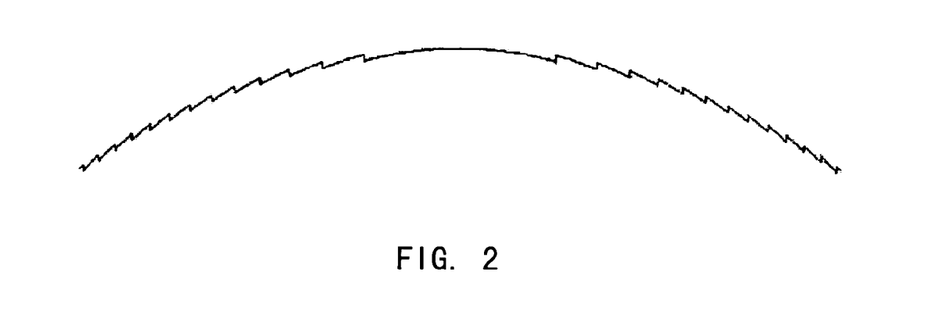
FIG. 2 is an enlarged, cross-sectional view of a diffraction grating on a convex surface of a lens of the lens system of FIG. 1.

FIG. 1 shows a schematic configuration of an image pick-up lens system (hereinafter, "lens system") in accordance with a preferred embodiment of the present invention. Light beams incident from an object side sequentially pass through an aperture stop 10, and then through a generally meniscus-shaped lens 20. The lens 20 has a concave first surface facing the object side, and a convex second surface facing an image side. The light beams are converged onto an image pick-up surface 40 of an image pickup device such as a CCD or a CMOS. Usually, a cover glass 30 is provided between the lens 20 and the image pick-up surface 40. The lens 20 has a diffraction grating formed on the second surface (not labeled) facing the image side. FIG. 2 shows a sectional view of the diffraction grating of the lens 20. The first surface (not labeled) of the lens 20 facing the object side is aspheric. Preferably, both the first and second surfaces of the lens 20 are aspheric.

The aperture stop 10 is arranged closest to the object in order to narrow down an incident angle of chief rays being projected onto the image pick-up surface 40 located at the image side. In addition, this arrangement of the aperture stop 10 helps shorten a total length of the lens system. For further cost reduction, the aperture stop 10 is preferably formed directly on the first surface (not labeled) of the lens 20 on the object side. In practice, a portion of the first surface of the lens 20 through which light rays are not transmitted is coated with a black material, which functions as the aperture stop 10.

The lens system satisfies the following condition:

$$0.1 < R2/R1 < 0.5, \quad (1)$$

wherein, R1 is an absolute value of a radius of curvature of a vertex of the first surface of the lens 20, and R2 is an absolute value of a radius of curvature of a vertex of the second surface of the lens 20. Condition (1) governs a distribution of refracting power for the lens 20, in order to correct monochromatic aberrations. When the ratio R2/R1 is above the upper limit of 0.5, R2 is too large and the refracting power of the second surface of the lens 20 is reduced. In order that the lens 20 has a proper refracting power, a thickness of the lens 20 is generally increased. Thus, zones of the diffraction grating of the lens 20 are increased, and the critical dimension of the diffraction grating is apt to be too small. In such case, the diffraction grating cannot be readily manufactured. When the ratio R2/R1 is below the lower limit of 0.1, R2 is too small. Thus, monochromatic aberration of the lens system, especially field curvature, is increased. It is difficult to appropriately correct the monochromatic aberration.

Preferably, in order to provide low cost and excellent optical performance, the lens system satisfies the following condition:

$$0.5 < d2/R2 < 1.5, \quad (2)$$

wherein, d2 is a thickness of the lens 20; that is, a distance from the vertex of the first surface to the vertex of the second surface of the lens 20. Condition (2) is for limiting the thickness of the lens 20. When the ratio d2/R2 is above the upper limit of 1.5, zones of the diffraction grating of the lens 20 are increased, and the critical dimension of the diffraction grating is apt to be too small. In such case, the diffraction grating cannot be readily manufactured. When the ratio d2/R2 is below the lower limit of 0.5, curvature of the lens 20 is generally increased, in order that the lens 20 has a certain refracting power. In such case, it is difficult to appropriately correct monochromatic aberration of the lens system.

Preferably, the lens system satisfies the following condition:

$$(3) \quad 200 < -C2 \times f < 450,$$

wherein, C2 is the power phase coefficient of the phase function of the diffraction grating formed on the second surface of the lens 20, and f is the focal length of the lens system. Condition (3) is for limiting the share of refracting power of the diffraction grating on the second surface of the lens 20. In one aspect, when the ratio $-C_2 \times f$ is above the lower limit of 200, the diffraction grating has a relatively large critical dimension and is thus relatively easy to manufacture. In another aspect, when the ratio $-C_2 \times f$ is below the upper limit of 450, the diffraction grating has proper refracting power and can appropriately correct chromatic aberration of the lens system.

Further, the lens system satisfies the following condition:

$$d1/T < 0.15, \quad (4)$$

wherein, d1 is a length from the aperture stop 10 to the first surface of the lens 20, and T is a total length from the aperture stop 10 to the image pick-up surface 40. Condition (4) is for limiting a position of the aperture stop 10. When the lens system satisfies the condition, the aperture stop 10 is positioned adjacent the lens 20. Thus, the lens system is favorable to correcting astigmatism and distortion of the lens system. In addition, the lens system is favorable to shortening a total length thereof. Furthermore, the lens system is favorable to lessening projection heights of chief rays being projected at the first surface of the lens 20. Thus, zones of the diffraction grating are decreased, and the critical dimension of the diffraction grating is relatively large. This makes the diffraction grating relatively easy to manufacture.

Also, in order to simplify the required manufacturing technology and reduce manufacturing costs, the lens 20 is made from an optical plastic or an optical resin. Preferably, the lens 20 is made from a zeonex material or an equivalent material having low water absorbency, for preventing the lens from deforming due to water absorption. Accordingly, the optical performance of the lens system can be preserved.

The above explanations outline fundamental constituent features of the present invention. Examples of the lens system will be described below with reference to FIGS. 3-23. It is to be understood that the invention is not limited to these examples. The following are symbols used in each exemplary embodiment.

T: length from the aperture stop 10 to the image pick-up surface 40 f: focal length of the lens system

FNo: F number $2\omega$: angle of field of view

R: radius of curvature of vertex of a surface d: distance between surfaces on the optical axis of the lens system Nd: refractive index of lens $\nu$: Abbe constant In each example, at least one surface of the lens 20 is aspheric. The lens 20 is made from the 480R type of zeonex material, which is available from the Japanese Zeon Corporation. The 480R type of zeonex material has a refractive index of 1.531170 and an Abbe constant of 56.0. Alternatively, the lens 20 is made from another material having characteristics similar to those of the 480R type of zeonex material. The shape of each aspheric surface is provided by expression 1 below. Expression 1 is based on a Cartesian coordinate system, with the vertex of the surface being the origin, and the optical axis extending from the vertex being the x-axis.

Expression 1:

$$x = \frac{cr^2}{1 + \sqrt{1-(k+1)c^2 r^2}} + \sum A_{2i} r^{2i}$$

wherein, x is a height from a plane which is tangent with the vertex of the surface to the surface, h is a height from the optical axis to the surface, c is a vertex curvature, k is a conic constant, and $A_{2i}$ are 2i-th order correction coefficients of the aspheric surface.

The diffraction grating is formed on the second surface of the lens 20, and the diffraction grating profile is provided by the phase modulation expression 2 below.

Expression 2:

$$\phi(r) = \sum_i C_{2i} r^{2i} = C_2 r^2 + C_4 r^4 + C_6 r^6 + C_8 r^8 + C_{10} r^{10}$$

wherein, $\phi(r)$ is equal to an integer multiple of $2\pi r$, is the height from the optical axis of the lens 20 to the surface of the diffraction grating profile, and $C_{2i}$ is the 2i-th power phase coefficient of the phase function of the diffraction grating.

EXAMPLE 1

Tables 1, 2 and 3 show lens data of a lens system of a first exemplary embodiment of the present invention.

TABLE 1

| f = 6.00 mm  T = 9.64 mm  FNo = 2.8  $2\omega$ = 40° | | | |
|---|---|---|---|
| Surface | R (mm) | d (mm) | k |
| stop 10 | infinity | 0.2 | 0 |
| 1st | −15.74184 | 2.920268 | 39.0638 |
| 2nd | −2.970739 | 1.500015 | −1.207477 |

TABLE 2

| | | Surface | |
|---|---|---|---|
| | | 1st | 2nd |
| Aspheric coefficient | A4 | −6.784549 × 10$^{-3}$ | −3.557302 × 10$^{-3}$ |
| | A6 | −3.567273 × 10$^{-3}$ | −3.330227 × 10$^{-3}$ |
| | A8 | 4.026179 × 10$^{-4}$ | 2.251311 × 10$^{-3}$ |
| | A10 | — | −7.296252 × 10$^{-4}$ |
| | A12 | — | 8.238202 × 10$^{-5}$ |

TABLE 3

| | Diffractive phase coefficients | | | | |
|---|---|---|---|---|---|
| Surface | $C_2$ | $C_4$ | $C_6$ | $C_8$ | $C_{10}$ |
| 2nd | −59.9158 | 21.783127 | −17.456913 | 5.5421831 | −0.62972923 |

Figure 3:
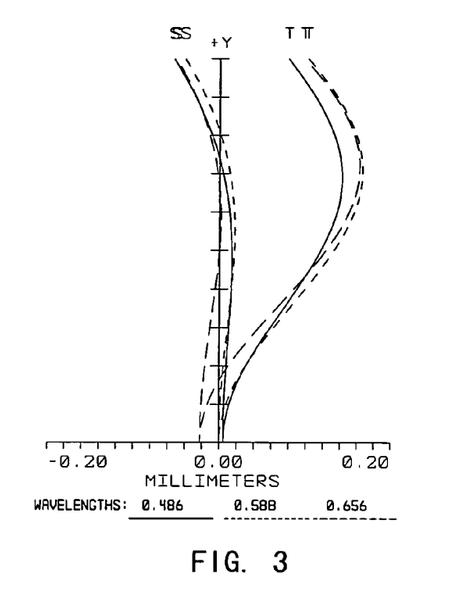
FIGS. 3-5 are graphs respectively showing field curvature and distortion, longitudinal spherical aberration, and lateral chromatic aberration curves for a lens system in accordance with a first exemplary embodiment of the present invention.
Figure 4:
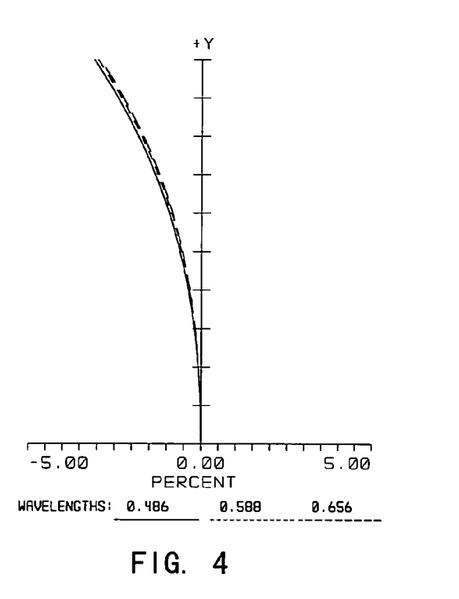
Figure 5:
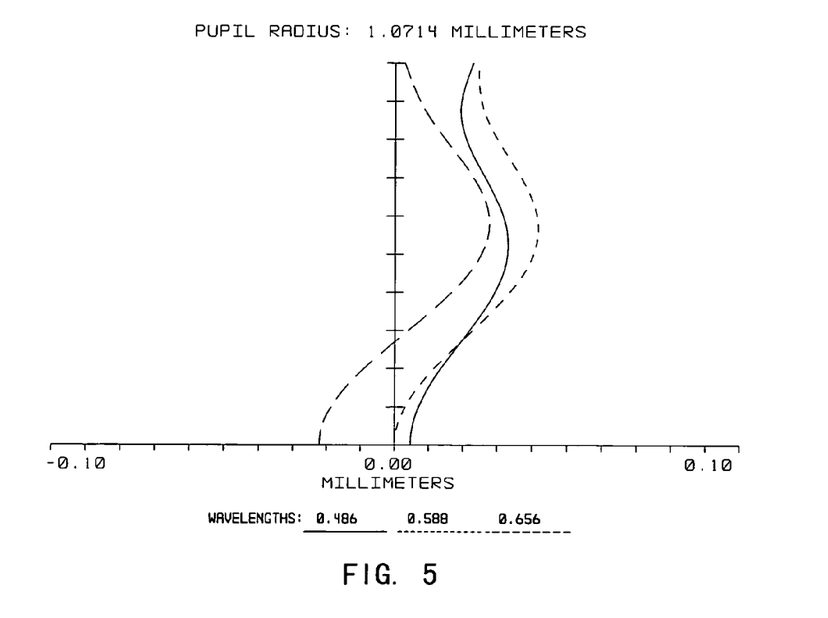

FIGS. 3-5 are graphs of field curvature/distortion, longitudinal spherical aberration and lateral chromatic aberration curves of the lens system of Example 1. FIGS. 3 and 4 respectively show field curvature and distortion curves.

EXAMPLE 2

Tables 4, 5 and 6 show lens data of a lens system of a second exemplary embodiment of the present invention.

TABLE 4 f = 6.00 mm  T = 9.60 mm  FNo = 2.8  2ω = 40°

| Surface | R (mm) | d (mm) | k |
|---|---|---|---|
| stop 10 | infinity | 0.6250136 | 0 |
| 1st | −8.612256 | 2.294404 | 36.387 |
| 2nd | −2.650678 | 1.5 | −0.8850095 |

TABLE 5

| | | Surface | |
|---|---|---|---|
| | | 1st | 2nd |
| Aspheric coefficient | A4 | $-1.133186 \times 10^{-2}$ | $-7.563581 \times 10^{-3}$ |
| | A6 | $7.294643 \times 10^{-4}$ | $-3.68951 \times 10^{-4}$ |
| | A8 | $-1.625306 \times 10^{-4}$ | $-1.966741 \times 10^{-5}$ |
| | A10 | — | $-3.243501 \times 10^{-5}$ |
| | A12 | — | $-3.550969 \times 10^{-6}$ |

TABLE 6

Diffractive phase coefficients

| Surface | $C_2$ | $C_4$ | $C_6$ | $C_8$ | $C_{10}$ |
|---|---|---|---|---|---|
| 2nd | −55.391168 | 10.536243 | −7.7660407 | 2.0825812 | −0.20555381 |

Figure 6:
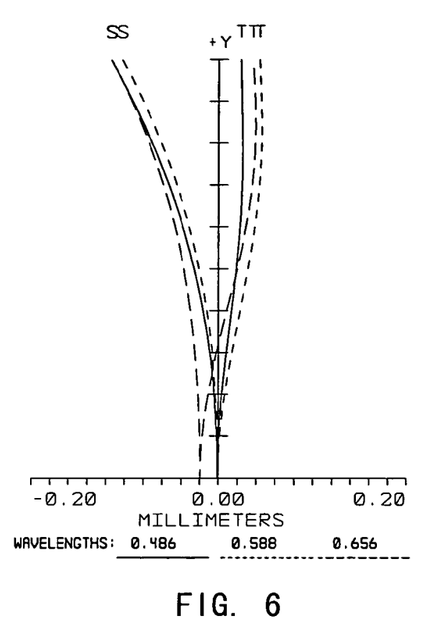
FIGS. 6-8 are graphs respectively showing field curvature and distortion, longitudinal spherical aberration, and lateral chromatic aberration curves for a lens system in accordance with a second exemplary embodiment of the present invention.
Figure 7:
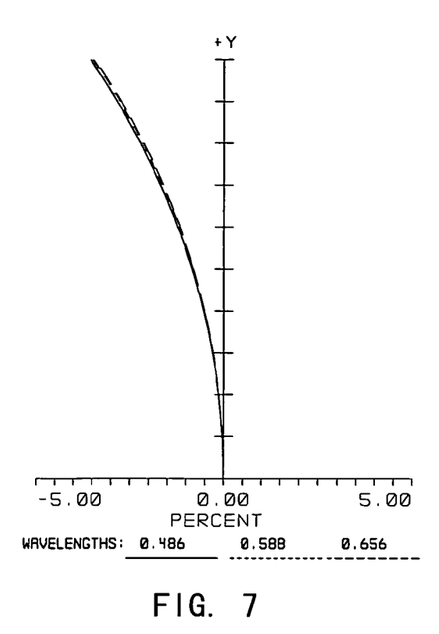
Figure 8:
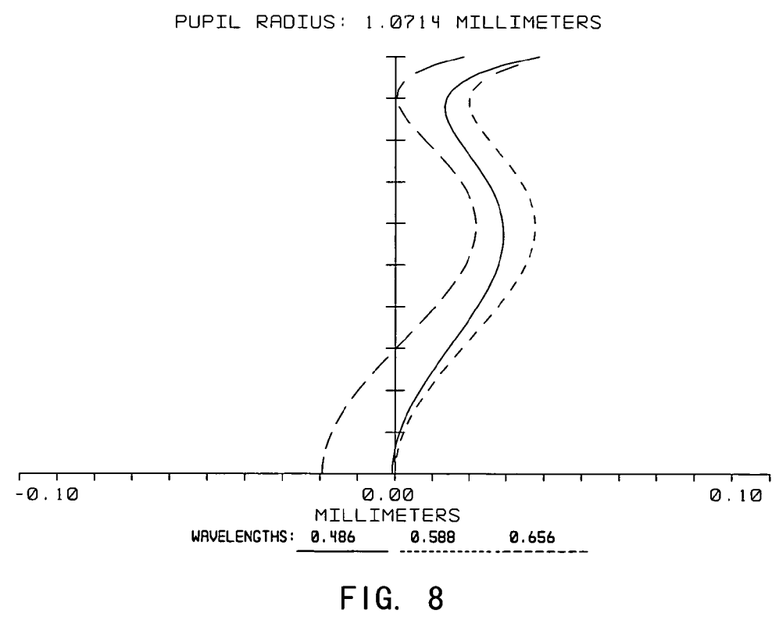

FIGS. 6-8 are graphs of field curvature/distortion, longitudinal spherical aberration and lateral chromatic aberration curves of the lens system of Example 2. FIGS. 6 and 7 respectively show field curvature and distortion curves.

EXAMPLE 3

Tables 7, 8 and 9 show lens data of a lens system of a third exemplary embodiment of the present invention.

TABLE 7 f = 5.00 mm  T = 8.07 mm  FNo = 2.8  2ω = 50°

| Surface | R (mm) | d (mm) | k |
|---|---|---|---|
| stop 10 | infinity | 0.5208771 | 0 |
| 1st | −6.542626 | 1.904689 | 1.055333 |
| 2nd | −2.167978 | 1.250006 | −5.363935 |

TABLE 8

| | | Surface | |
|---|---|---|---|
| | | 1st | 2nd |
| Aspheric coefficient | A4 | $-1.913699 \times 10^{-2}$ | $-5.908844 \times 10^{-2}$ |
| | A6 | $-1.332145 \times 10^{-2}$ | $1.097531 \times 10^{-2}$ |
| | A8 | $-2.579758 \times 10^{-2}$ | $-2.621354 \times 10^{-3}$ |
| | A10 | $4.525761 \times 10^{-2}$ | $3.979963 \times 10^{-4}$ |
| | A12 | $-2.317013 \times 10^{-2}$ | $-1.176006 \times 10^{-4}$ |

TABLE 9

Diffractive phase coefficients

| Surface | $C_2$ | $C_4$ | $C_6$ | $C_8$ | $C_{10}$ |
|---|---|---|---|---|---|
| 2nd | −72.273565 | 16.440189 | −18.41883 | 5.9835745 | −0.6216066 |

Figure 9:
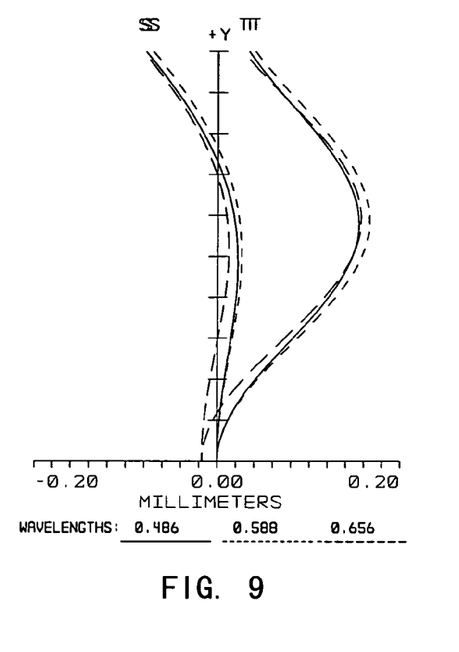
FIGS. 9-11 are graphs respectively showing field curvature and distortion, longitudinal spherical aberration, and lateral chromatic aberration curves for a lens system in accordance with a third exemplary embodiment of the present invention.
Figure 10:
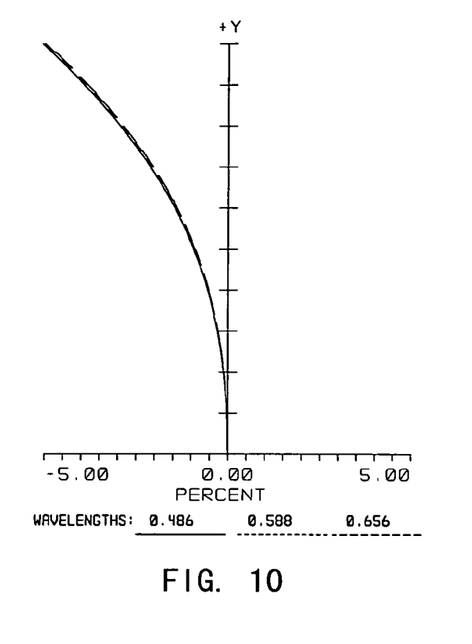
Figure 11:
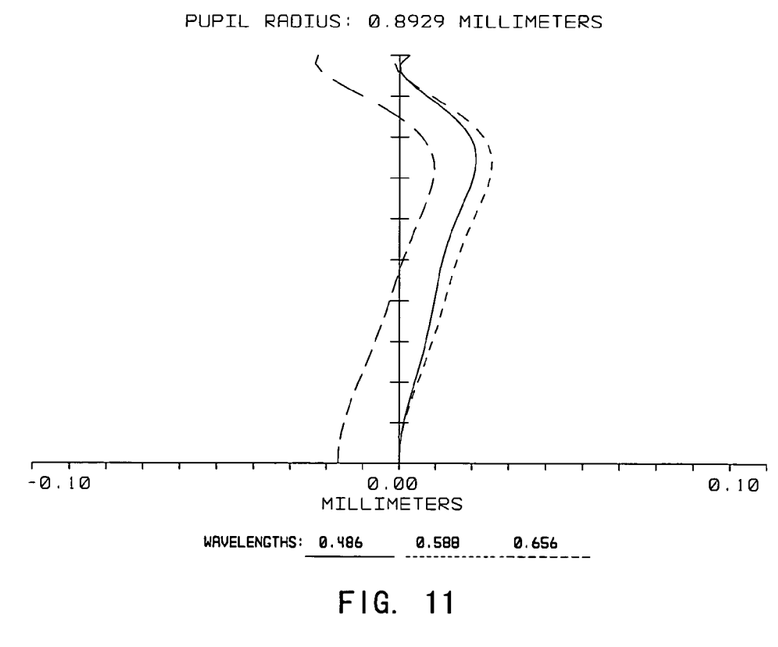

FIGS. 9-11 are graphs of field curvature/distortion, longitudinal spherical aberration and lateral chromatic aberration curves of the lens system of Example 3. FIGS. 9 and 10 respectively show field curvature and distortion curves.

EXAMPLE 4

Tables 10, 11 and 12 show lens data of a lens system of a fourth exemplary embodiment of the present invention.

TABLE 10 f = 5.00 mm  T = 8.26 mm  FNo = 2.8  2ω = 50°

| Surface | R (mm) | d (mm) | k |
|---|---|---|---|
| stop 10 | infinity | 0.5208771 | 0 |
| 1st | −8.547376 | 2.163124 | −40 |
| 2nd | −2.303415 | 1.250006 | −8.788601 |

TABLE 11

| | | Surface | |
|---|---|---|---|
| | | 1st | 2nd |
| Aspheric coefficient | A4 | $-2.103606 \times 10^{-2}$ | $-7.735895 \times 10^{-2}$ |
| | A6 | $-2.549838 \times 10^{-2}$ | $2.879511 \times 10^{-2}$ |
| | A8 | $2.376307 \times 10^{-2}$ | $1.013308 \times 10^{-2}$ |
| | A10 | $-1.280794 \times 10^{-2}$ | $1.959583 \times 10^{-3}$ |
| | A12 | $7.982688 \times 10^{-4}$ | $-1.863782 \times 10^{-4}$ |

TABLE 12

Diffractive phase coefficients

| Surface | $C_2$ | $C_4$ | $C_6$ | $C_8$ | $C_{10}$ |
|---|---|---|---|---|---|
| 2nd | −72.238636 | 10.509695 | −11.542296 | 4.3823204 | −0.62401974 |

Figure 12:
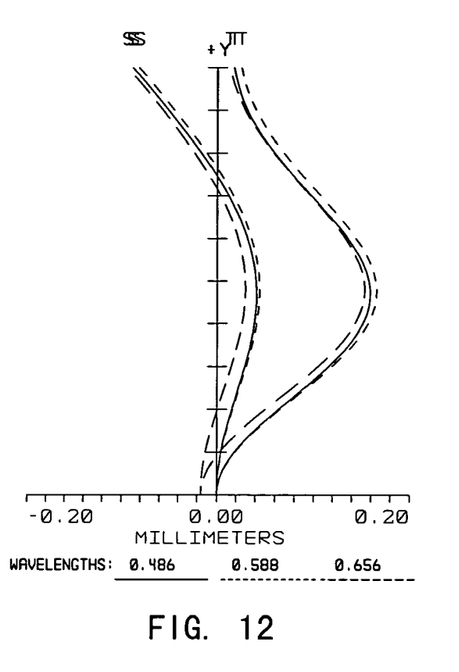
FIGS. 12-14 are graphs respectively showing field curvature and distortion, longitudinal spherical aberration, and lateral chromatic aberration curves for a lens system in accordance with a fourth exemplary embodiment of the present invention.
Figure 13:
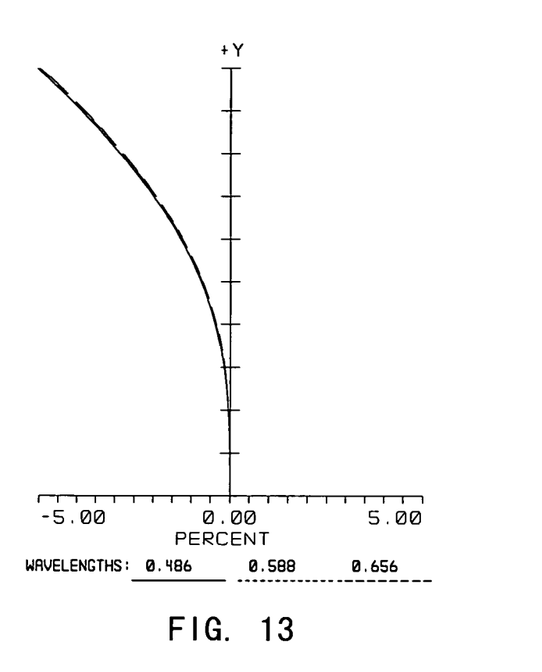
Figure 14:
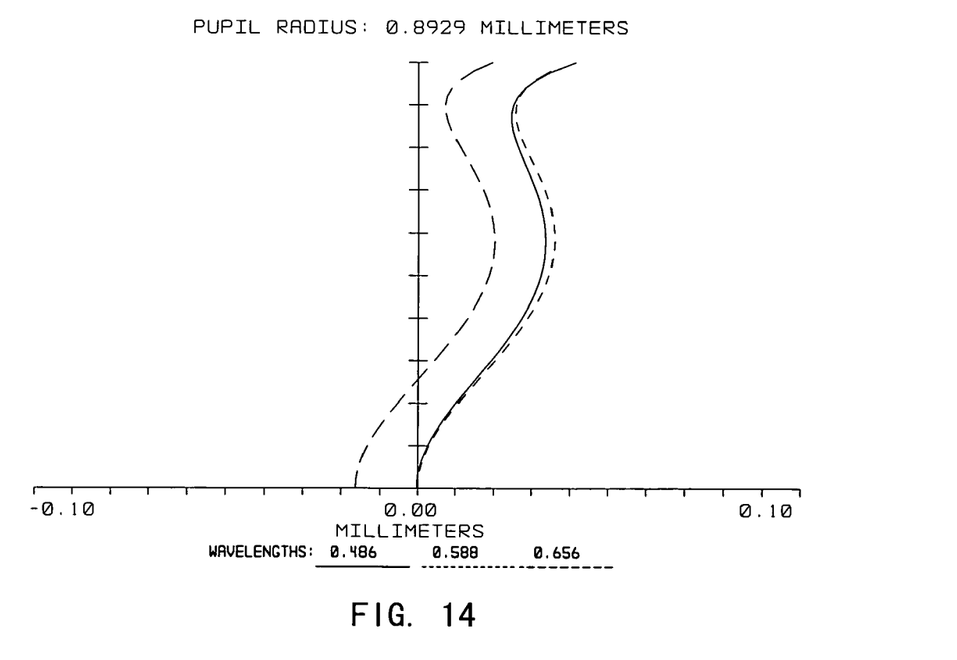

FIGS. 12-14 are graphs of field curvature/distortion, longitudinal spherical aberration and lateral chromatic aberration curves of the lens system of Example 4. FIGS. 12 and 13 respectively show field curvature and distortion curves.

EXAMPLE 5

Tables 13, 14 and 15 show lens data of a lens system of a fifth exemplary embodiment of the present invention.

TABLE 13 f = 5.00 mm  T = 7.81 mm  FNo = 2.8  2ω = 50°

| Surface | R (mm) | d (mm) | k |
|---|---|---|---|
| stop 10 | infinity | 0.5208778 | 0 |
| 1st | −5.310174 | 1.616879 | 21.65854 |
| 2nd | −2.049351 | 1.250007 | −10.31478 |

TABLE 14

|  |  | Surface | |
|---|---|---|---|
|  |  | 1st | 2nd |
| Aspheric coefficient | A4 | $-8.738443 \times 10^{-3}$ | $-1.383351 \times 10^{-1}$ |
|  | A6 | $-1.729855 \times 10^{-2}$ | $8.131012 \times 10^{-2}$ |
|  | A8 | $1.103174 \times 10^{-2}$ | $-4.393596 \times 10^{-2}$ |
|  | A10 | — | $1.336700 \times 10^{-2}$ |
|  | A12 | — | $-1.919544 \times 10^{-3}$ |

TABLE 15

| | Diffractive phase coefficients | | | | |
|---|---|---|---|---|---|
| Surface | $C_2$ | $C_4$ | $C_6$ | $C_8$ | $C_{10}$ |
| 2nd | −82.586443 | 46.385298 | −51.119793 | 21.129491 | −3.1985255 |

Figure 15:
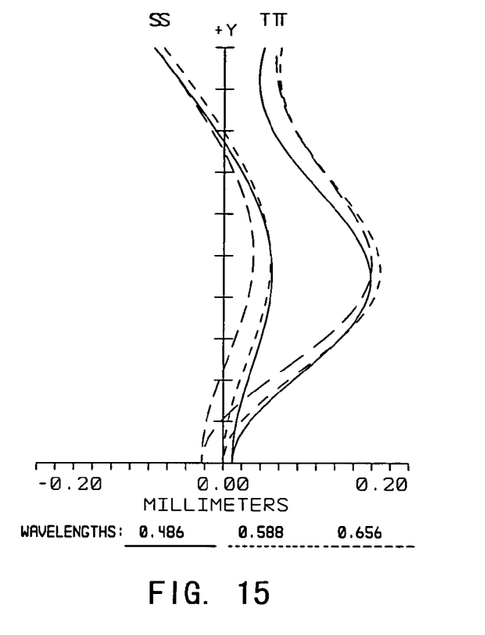
FIGS. 15-17 are graphs respectively showing field curvature and distortion, longitudinal spherical aberration, and lateral chromatic aberration curves for a lens system in accordance with a fifth exemplary embodiment of the present invention.
Figure 16:
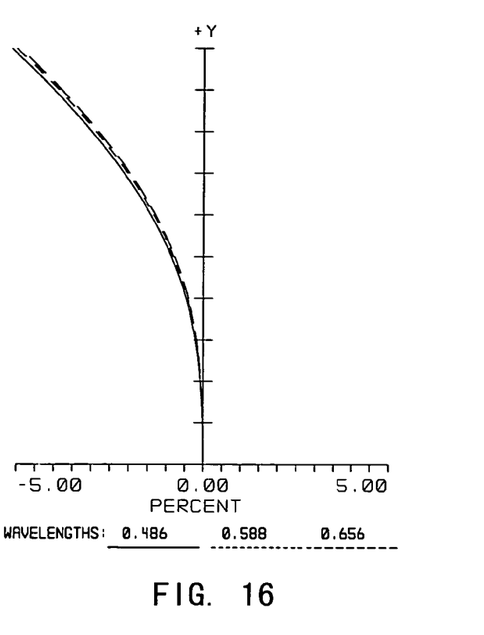
Figure 17:
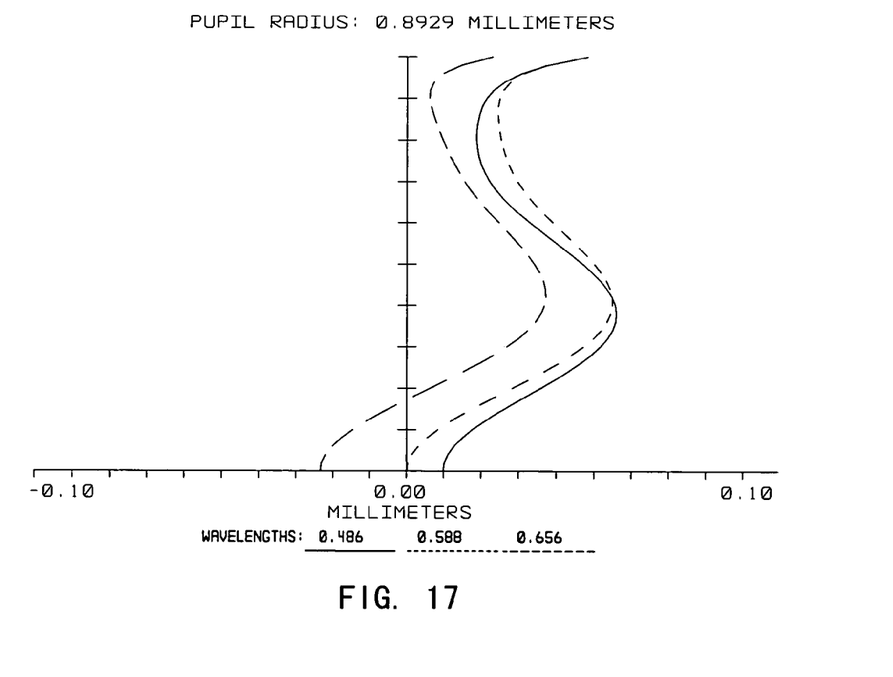

FIGS. 15-17 are graphs of field curvature/distortion, longitudinal spherical aberration and lateral chromatic aberration curves of the lens system of Example 5. FIGS. 15 and 16 respectively show field curvature and distortion curves.

EXAMPLE 6

Tables 16, 17 and 18 show lens data of a lens system of a sixth exemplary embodiment of the present invention.

TABLE 16

| $f = 6.40$ mm $T = 10.53$ mm FNo = 2.8 $2\omega = 40°$ | | | |
|---|---|---|---|
| Surface | R (mm) | d (mm) | k |
| stop 10 | infinity | 0.6000074 | 0 |
| 1st | −12.19669 | 2.875063 | 40 |
| 2nd | −2.993113 | 2 | 0 |

TABLE 17

|  |  | Surface | |
|---|---|---|---|
|  |  | 1st | 2nd |
| Aspheric coefficient | A4 | $-8.754626 \times 10^{-3}$ | — |
|  | A6 | $1.833210 \times 10^{-3}$ | — |
|  | A8 | $-5.203364 \times 10^{-3}$ | — |
|  | A10 | $3.734467 \times 10^{-3}$ | — |
|  | A12 | $-9.727292 \times 10^{-4}$ | — |

TABLE 18

| | Diffractive phase coefficients | | | | |
|---|---|---|---|---|---|
| Surface | $C_2$ | $C_4$ | $C_6$ | $C_8$ | $C_{10}$ |
| 2nd | −47.35428 | 4.928356 | −3.0726523 | 0.81838735 | −0.10389311 |

Figure 18:
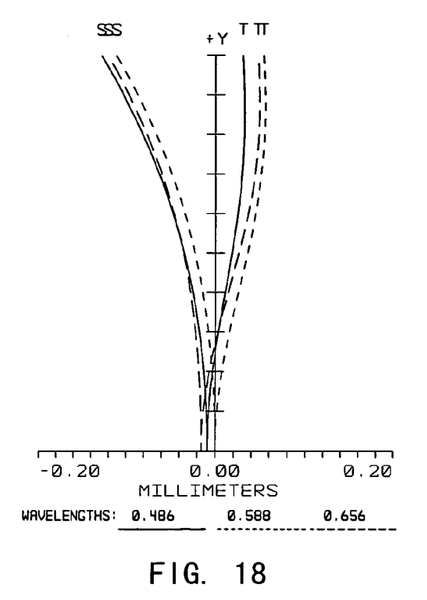
FIGS. 18-20 are graphs respectively showing field curvature and distortion, longitudinal spherical aberration, and lateral chromatic aberration curves for a lens system in accordance with a sixth exemplary embodiment of the present invention.
Figure 19:
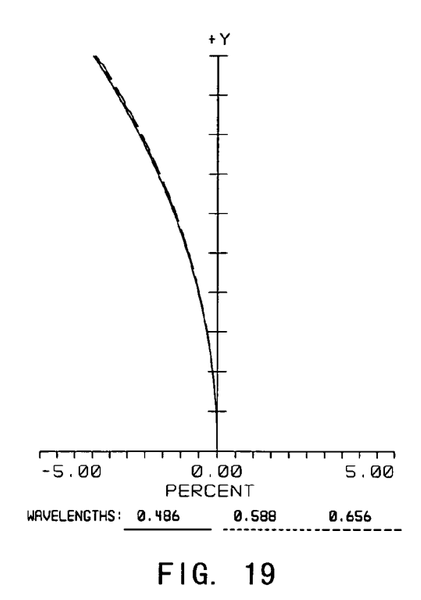
Figure 20:
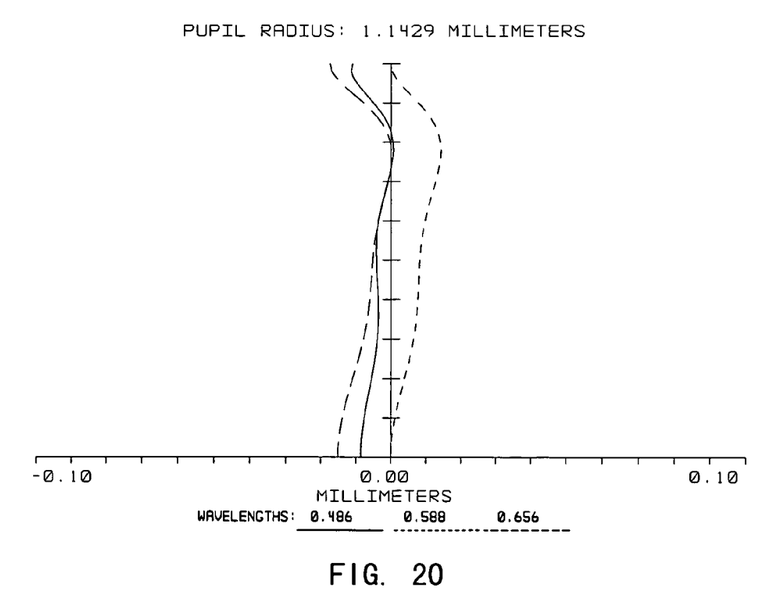

FIGS. 18-20 are graphs of field curvature/distortion, longitudinal spherical aberration and lateral chromatic aberration curves of the lens system of Example 6. FIGS. 18 and 19 respectively show field curvature and distortion curves.

EXAMPLE 7

Tables 19, 20 and 21 show lens data of a lens system of a seventh exemplary embodiment of the present invention.

TABLE 19

| $f = 5050$ mm $T = 9.32$ mm FNo = 2.8 $2\omega = 46°$ | | | |
|---|---|---|---|
| Surface | R (mm) | d (mm) | k |
| stop 10 | infinity | 0.6000026 | 0 |
| 1st | −12.16373 | 2.667886 | 39.98218 |
| 2nd | −2.686981 | 2 | 0 |

TABLE 20

|  |  | Surface | |
|---|---|---|---|
|  |  | 1st | 2nd |
| Aspheric coefficient | A4 | $-9.110679 \times 10^{-3}$ | — |
|  | A6 | $-1.007966 \times 10^{-3}$ | — |
|  | A8 | $-7.599949 \times 10^{-3}$ | — |
|  | A10 | $7.190223 \times 10^{-3}$ | — |
|  | A12 | $-2.491091 \times 10^{-3}$ | — |

TABLE 21

| | Diffractive phase coefficients | | | | |
|---|---|---|---|---|---|
| Surface | $C_2$ | $C_4$ | $C_6$ | $C_8$ | $C_{10}$ |
| 2nd | −73.30975 | 27.231721 | −16.670061 | 4.6866009 | −0.5448699 |

Figure 21:
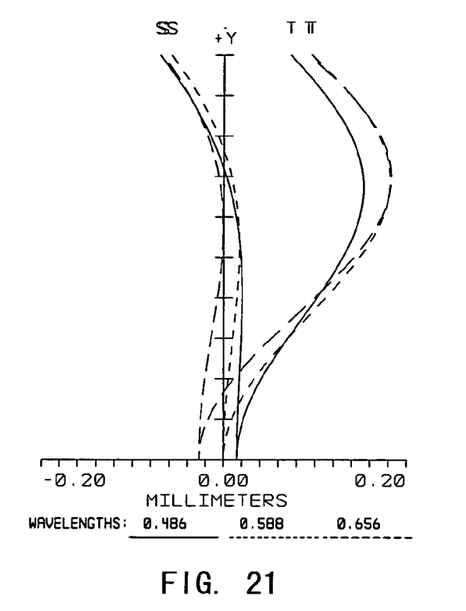
FIGS. 21-23 are graphs respectively showing field curvature and distortion, longitudinal spherical aberration, and lateral chromatic aberration curves for a lens system in accordance with a seventh exemplary embodiment of the present invention.
Figure 22:
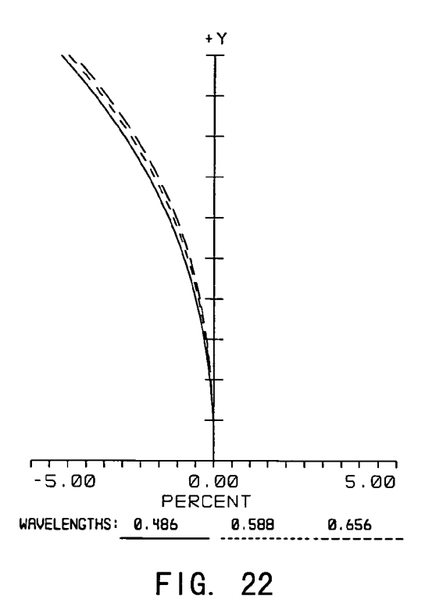
Figure 23:
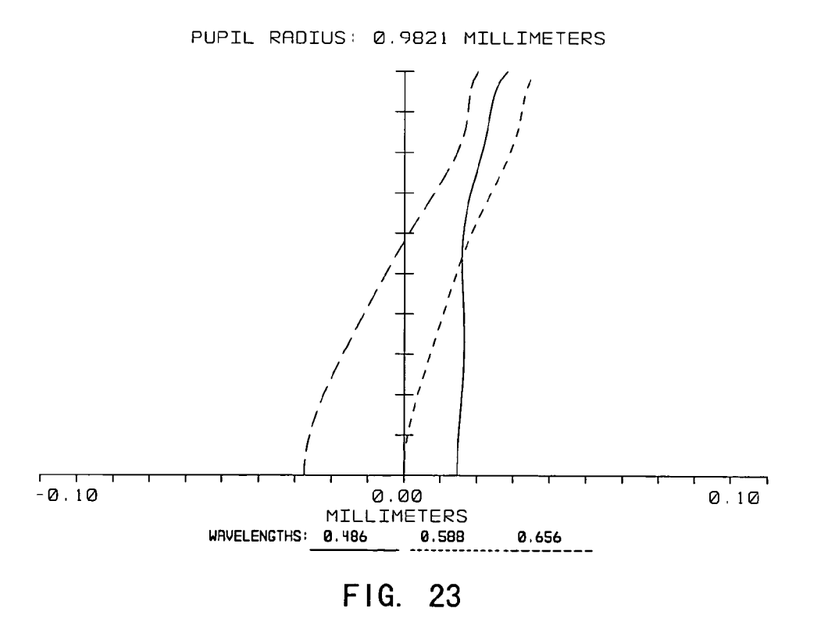

FIGS. 21-23 are graphs of field curvature/distortion, longitudinal spherical aberration and lateral chromatic aberration curves of the lens system of Example 7. FIGS. 21 and 22 respectively show field curvature and distortion curves.

Table 22 compares focal lengths and other parameters across Examples 1 through 7.

TABLE 22

| | Example | | | | | | |
|---|---|---|---|---|---|---|---|
| | 1 | 2 | 3 | 4 | 5 | 6 | 7 |
| FNo | 2.8 | 2.8 | 2.8 | 2.8 | 2.8 | 2.8 | 2.8 |
| 2ω (°) | 40 | 40 | 50 | 50 | 50 | 40 | 46 |
| T (mm) | 9.64 | 9.60 | 8.07 | 8.26 | 7.81 | 10.53 | 9.32 |
| f (mm) | 6.00 | 6.00 | 5.00 | 5.00 | 5.00 | 6.40 | 5.50 |
| T/f | 1.61 | 1.60 | 1.61 | 1.65 | 1.56 | 1.65 | 1.70 |
| d1/T | 0.021 | 0.065 | 0.065 | 0.063 | 0.067 | 0.057 | 0.064 |
| R2/R1 | 0.19 | 0.31 | 0.33 | 0.27 | 0.39 | 0.25 | 0.22 |
| D2/R2 | 0.98 | 0.87 | 0.88 | 0.94 | 0.79 | 0.96 | 0.99 |
| $-C_2 \times f$ | 359 | 332 | 361 | 361 | 412 | 303 | 403 |

It is believed that the present embodiments and their advantages will be understood from the foregoing description, and it will be apparent that various changes may be made thereto without departing from the spirit and scope of the invention or sacrificing all of its material advantages, the examples hereinbefore described merely being preferred or exemplary embodiments of the invention.

We claim:

1. An image pick-up lens system comprising, from an object side to an image side:
   an aperture stop; and
   a lens having a concave first surface on the object side and a convex second surface on the image side, and satisfying the following condition:

$$0.1 < R2/R1 < 0.5, \quad (1)$$

wherein, R1 is an absolute value of a radius of curvature of a vertex of the first surface of the lens on the object side, and R2 is an absolute value of a radius of curvature of a vertex of the second surface of the lens on the image side; and
   a diffraction grating provided at the second surface of the lens and satisfying the following condition:

$$200 < -C_2 \times f < 450, \quad (2)$$

wherein, f is a focal length of the image pick-up lens system, and $C_2$ is a power phase coefficient of a phase function of the diffraction grating of the second surface of the lens.

2. The image pick-up lens system of claim 1, wherein the lens has at least one aspheric surface.

3. The image pick-up lens system of claim 2, wherein the first surface of the lens is aspheric.

4. The image pick-up lens system of claim 2, wherein each of the first and second surfaces of the lens is aspheric.

5. The image pick-up lens system of claim 1, wherein the following condition is satisfied:

$$0.5 < d2/R2 < 1.5, \quad (3)$$

wherein, d2 is a thickness of the lens.

6. The image pick-up lens system of claim 1, wherein the following condition is satisfied:

$$d1/T < 0.15 \quad (3)$$

wherein, d1 is a length from the aperture stop to the first surface of the lens, and T is a total length from the aperture stop to an image pick-up surface.

7. The image pick-up lens system of claim 1, wherein the lens is made from an optical plastic or an optical resin.

8. The image pick-up lens system of claim 7, wherein the lens is made from a material having low water absorbency.

9. An image pick-up lens system comprising:
   an aperture stop; and
   a meniscus-shaped lens having a concave surface on an object side and a convex surface on an image side, and satisfying the following condition:

$$(1) \, 0.1 < R2/R1 < 0.5,$$

wherein, R1 is an absolute value of a radius of curvature of a vertex of the concave surface of the lens on the object side, and R2 is an absolute value of a radius of curvature of a vertex of the convex surface of the lens on the image side; and
   the aperture stop and the lens are aligned in that order from the object side to the image side, the lens has a diffraction grating formed at the convex surface, which diffraction grating satisfies the following condition:

$$200 < -C_2 \times f < 450, \quad (2)$$

wherein, f is a focal length of the image pick-up lens system, and $C_2$ is a power phase coefficient of a phase function of the diffraction grating of the convex surface of the lens.

10. The image pick-up lens system of claim 9, wherein the lens has a concave surface on the object side.

11. The image pick-up lens system of claim 10, wherein the lens has at least one aspheric surface.

12. The image pick-up lens system of claim 10, wherein each of the convex and concave surfaces of the lens is aspheric.

13. The image pick-up lens system of claim 9, wherein the following condition is satisfied:

$$0.5 < d2/R2 < 1.5, \quad (3)$$

wherein, d2 is a thickness of the lens.

14. The image pick-up lens system of claim 13, wherein the following condition is satisfied:

$$d1/T < 0.15, \quad (4)$$

wherein, d1 is a length from the aperture stop to the concave surface of the lens, and T is a total length from the aperture stop to an image pick-up surface.

15. The image pick-up lens system of claim 9, wherein the lens is made from a material having low water absorbency.

16. An image pick-up system comprising:
    an aperture stop of said system for receiving light from an outside of said system;
    an image pick-up surface of said system used to accept said light for image generation; and
    a lens disposed between said aperture stop and said image pick-up surface to accept said light from said aperture stop and transmit said light toward said image pick-up surface, said lens satisfying the following condition:

$$(1) \, 0.1 < R2/R1 < 0.5,$$

wherein R1 is an absolute value of a radius of curvature of a surface of said lens facing said aperture stop, and R2 is an absolute value of a radius of curvature of another surface of said lens facing said image pick-up surface; and
    said lens comprising a diffraction grating formed at said another surface of said lens facing said image pick-up surface, said diffraction grating satisfying the following condition:

$$200 < -C_2 \times f < 450, \quad (4)$$

wherein f is a focal length of said system, and $C_2$ is a power phase coefficient of a phase function of said diffraction grating of said another surface of said lens.

17. The image pick-up system of claim 16, wherein said lens is a meniscus-shaped lens having said another surface as a convex surface.

18. The image pick-up system of claim 16, wherein at least one surface of said lens is aspheric, and said lens is designed to follow at least one of the following conditions:

$$0.5 < d2/R2 < 1.5; \text{ and} \quad (3)$$

$$d1/T < 0.15, \quad (4)$$

wherein d2 is a thickness value of said lens, d1 is a length value from said aperture stop to said surface of said lens facing said aperture stop, and T is a total length value from said aperture stop to said image pick-up surface.

* * * * *